Nov. 4, 1952 G. W. SCHATZMAN 2,616,721
FENDER AND FENDER SHIELD CONSTRUCTION
Filed Oct. 28, 1948 2 SHEETS—SHEET 1
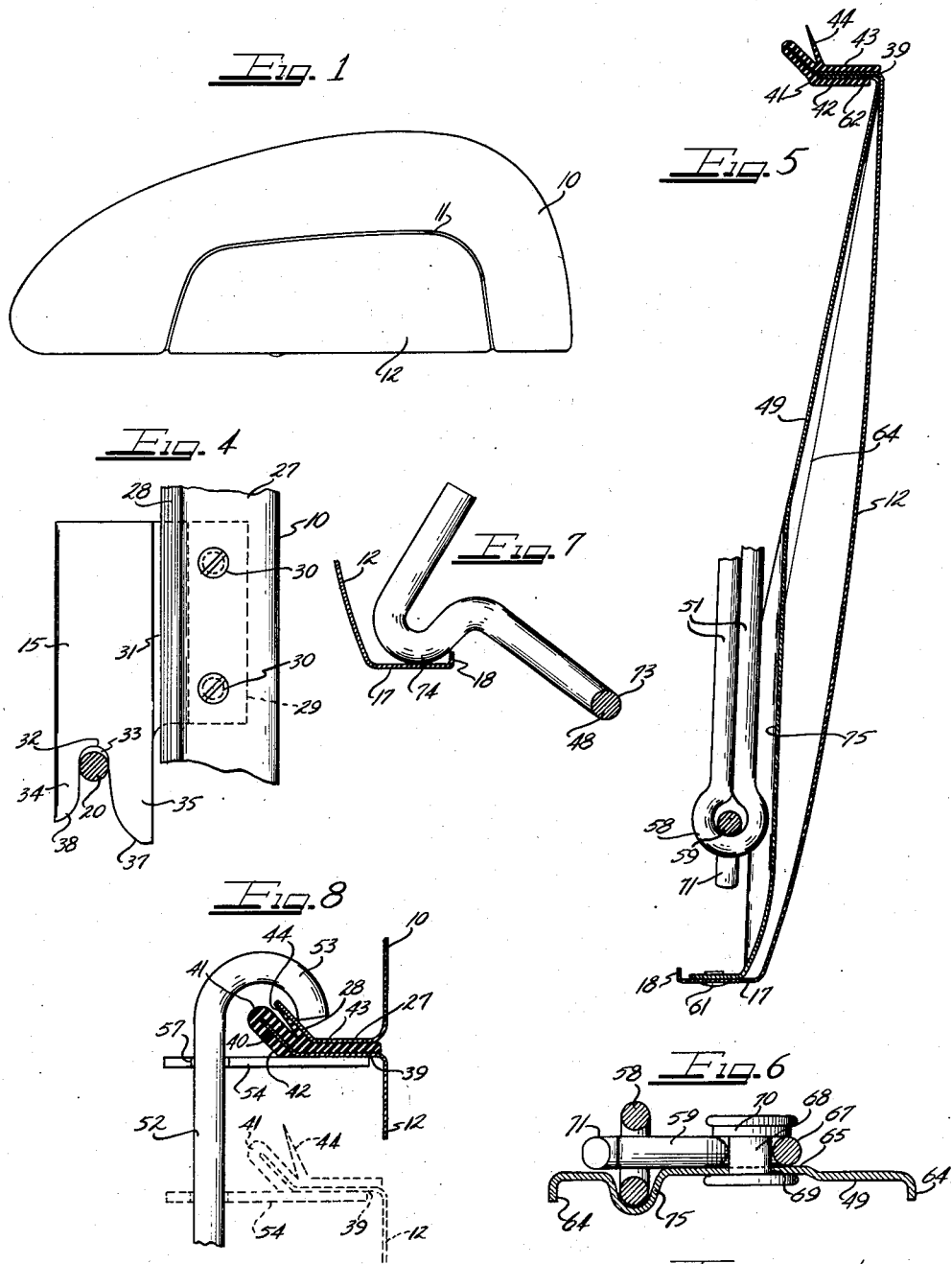
Inventor
GEORGE W. SCHATZMAN

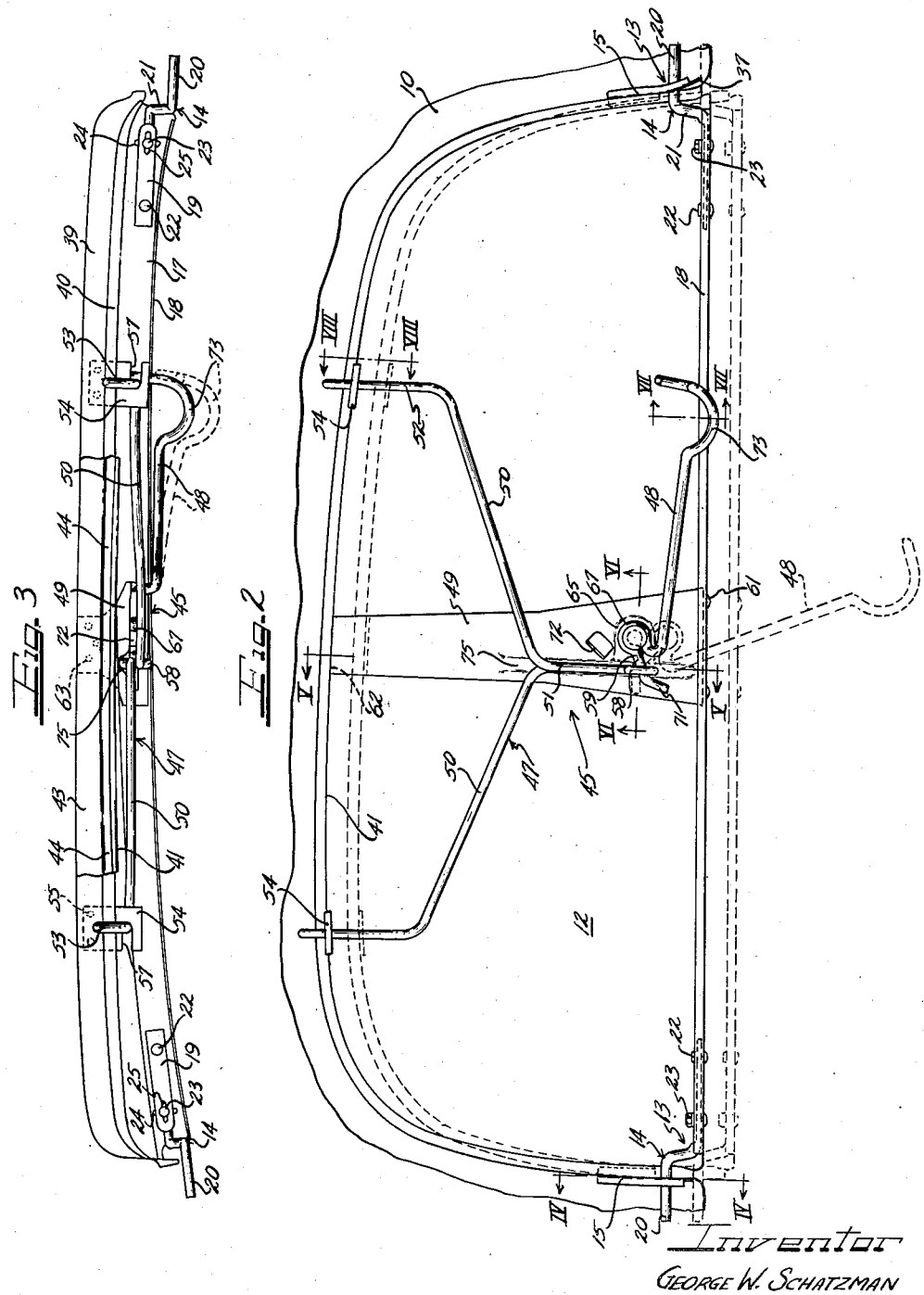

Patented Nov. 4, 1952

2,616,721

UNITED STATES PATENT OFFICE 2,616,721

FENDER AND FENDER SHIELD CONSTRUCTION

George W. Schatzman, Detroit, Mich., assignor to Houdaille-Hershey Corporation, Detroit, Mich., a corporation of Michigan Application October 28, 1948, Serial No. 57,040

20 Claims. (Cl. 280—153)

This invention relates to improvements in fender and fender shield constructions, and more particularly to improvements in the mounting of a fender shield on a fender.

In the vehicle industry, and particularly in the automobile branch thereof, various means have been utilized to improve the appearance of vehicle fenders. The usual vehicle fender is provided with an opening affording access to the vehicle wheel, and permitting ready removal or replacement of the wheel in a generally axial direction. Since this opening inherently presents a relatively unattractive outward appearance and is at high speed operation an air turbulence factor, detachable fender shields have been employed to cover the opening protectively and ornamentally.

As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender be separated from the vehicle body part, partly separated from the vehicle body part, or actually an integral part of the vehicle body and whether or not it projects outwardly from the principal body portion of the vehicle.

An important object of the present invention is to provide a novel fender and fender shield assembly in which the fender shield is detachably secured to the fender in a novel manner.

Another object of the invention is to provide a fender having improved means for attaching a fender shield in closing relation to the wheel access opening in the fender.

A further object of the invention is to provide a fender shield having improved means for attaching the fender shield to a fender.

A still further object of the invention is to provide a novel structure for detachably securing a fender shield to a fender.

Still another object of the invention is to provide new and improved means whereby a fender shield is adapted to be mounted with ease and dispatch in a simple, easily understood and readily executed maneuver.

Other objects, features and advantages of the present invention will be readily apparent from the following detailed description of a preferred embodiment thereof taken in conjunction with the accompanying two sheets of drawings in which:

Figure 1 is a more or less schematic view of a fender and fender shield assembly embodying the features of the present invention;

Figure 2 is an enlarged inside elevational view of the fender shield and the immediately adjacent portion of the fender;

Figure 3 is a top plan view of the fender shield;

Figure 4 is an enlarged fragmentary sectional elevational view taken substantially on the line IV—IV of Figure 2 and showing the construction and relationship of one of the end retaining brackets on the fender;

Figure 5 is an enlarged vertical sectional view taken substantially on the line V—V of Figure 2;

Figure 6 is an enlarged fragmentary sectional view taken substantially on the line VI—VI of Figure 2;

Figure 7 is an enlarged fragmentary sectional elevational view taken substantially on the line VII—VII of Figure 2; and Figure 8 is an enlarged fragmentary sectional elevational view taken substantially on the line VIII—VIII of Figure 2.

In a typical assembly embodying the features of the present invention, a fender 10 has a wheel access opening 11 which is closed by a removable fender shield 12. The arrangement and construction of the fender and fender shield are such that the fender shield has the outer surface thereof flush with the outer surface of the fender and provides a closure which as nearly as practicable appears in the final assembly as a part of the fender.

According to the present invention, the fender shield 12 is so constructed and related to the fender 10 that the fender shield is adapted to be assembled with the fender by lifting the fender shield upwardly in its plane into the wheel access opening 11. To this end, the fender shield has means at its opposite ends cooperating with means on the fender to define the position of the lower portion of the fender shield with respect to the fender and latching structure is carried at the inside of the fender shield for latching, retaining engagement with the fender to hold the fender shield in its wheel access opening and closing relation.

At the bottom of each of the opposite ends of the fender shield and of the fender at the opposite ends of the wheel access opening 11 is a cover retaining device 13 which comprises a trunnion member 14 on the fender shield and a cooperative bracket 15 on the fender (Figures 2, 3 and 4). These components are so constructed and related that upward movement of the fender shield in its plane causes the trunnion member 14 to interengage with the companion bracket member 15 in such manner as to properly align the bottom of the fender shield with the bottom of the fender.

The fender shield is preferably made from a suitable sheet material such as sheet metal, formed along its lower margin with an inturned substantially horizontal flange 17 having at its inner edge an upturned reinforcing flange 18. Each of the trunnion members 14 has a relatively flat elongated base member 19 supported upon the adjacent end portion of the flange 17 and secured thereto in appropriate manner to position a trunnion extremity portion 20 to extend beyond the end of the fender shield served by the trunnion member so as to be received in assembly behind the contiguous end portion of the fender defining the wheel access opening. As best seen in Figures 2 and 3, the trunnion extremity portion 20 in each instance is offset upwardly and inwardly relative to the base flange 19 through the medium of an integral offsetting neck portion 21. In a simple and practical structure, each of the trunnion members 14 may be made from appropriate gauge rod or wire stock appropriately bent into shape and with the flange portion 19 formed by a forging process to flatten out the base portion of the trunnion unit.

Attachment of the base portion 19 of each of the trunnion units to the supporting fender shield bottom flange 17 is preferably effected in such manner that the position of the trunnion extremity 20 is adjustable in a rearward or outward direction. To this end, a rivet 22 is employed to secure the free extremity portion of the flange 19 in pivotal relation to the supporting flange 17, and a bolt 23 secures the opposite end portion of the flange 19 adjustably. For this purpose, the fender shield flange 17 is formed with a transverse slot 24 (Figure 2) and the trunnion base flange 19 is formed with a longitudinal slot 25 through which the bolt extends whereby to afford proper clearance for pivotal adjustment of the trunnion member about the axis of the attachment rivet 22. Tightening of the bolt 23 secures the trunnion unit in proper adjusted position as may be determined for any individual installation.

About the edge of the fender 10 defining the wheel access opening 11 is provided a generally channel-shaped marginal flange comprising an inturned more or less right angular portion 27 and a divergent inner portion 28 extending at an inward diagonal angle thereto (Figures 2, 4 and 5). To the lower end portion of the fender flange 27 at each end of the wheel access opening is secured one of the fender shield retaining brackets 15. For this purpose, each of the brackets 15 comprises an elongated unit having an attachment flange secured as by means of screws 30 to the inner side of the flange 27 while an offsetting flange 31 clears the diagonal flange 28 of the fender and affords a connection between the attachment flange 29 and the principal body portion of the bracket 15.

Each of the bracket members 15 is so positioned on the supporting fender flange 27 that a bifurcated lower end portion 32 of the bracket will appropriately receive the trunnion extremity 20 of the companion trunnion member 14 of the fender shield in assembly and in cooperation with the trunnion member retain the lower end portion of the fender shield 12 in proper alignment in both vertical and planar relations. To this end, the bifurcated portion 32 provides a downwardly opening slot 33 defined by inner and outer bifurcation legs or fingers 34 and 35, respectively, and adapted to receive the trunnion portion 20 of the companion trunnion member in the bight thereof.

In effecting assembly of the trunnion members 14 with the bracket members 15, the fender shield 12 is manually positioned to bring the trunnion extremity portions 20 under the bracket yoke or fork 32, substantially as indicated in dash outline in Figure 2 and is then raised to enter the trunnion portions 20 into the locating slot 33. To facilitate this action, the outer leg or finger 35 is preferably longer than the inner finger 34 and has its inner or slot edge formed with a flaring cam edge 37 for directing the trunnion portion 20 into the bight of the slot 33. Similarly, the inner leg or finger 34 is formed with a flaring trunnion directing cam surface or edge 38. It will be observed that since the bracket members 15 are affixed in stationary relation to the fender 10 and the trunnion members 14 are secured in adjustable relation to the fender shield flange 17, appropriate planar adjustment can be easily effected by appropriate adjustment of the trunnion members 14 for each fender shield installation. Proper vertical relationship of the fender shield to the fender may be predetermined by the vertical position of the bracket members 15 in a fender shield installation where a sliding or overlapping relation with the outer face of the fender is desired, however, in the present instance the vertical location of the fender shield is otherwise attained and the principal function of the end retaining units 13 is to maintain the planar relationship of the fender and fender shield and hold the lower portion of the fender shield against displacement from the plane of the fender and against rattling.

In the finally assembled condition of the fender shield with the fender, a marginal flange 39 about the upper and end edges of the fender shield, and generally complementary in shape to the flange structure 27, 28 of the fender cooperates with the fender flange to define the vertical position of the fender shield in the wheel access opening 11 and also generally to define the planar position of the fender shield with respect to, and especially the upper portion of, the fender shield. To this end, the fender shield flange 39 extends inwardly and has a divergent angular inner terminal portion 40 adapted in assembly to lie generally parallel to the respective portions of the fender flange.

A sealing and rattle-proofing joint between the fender and fender shield is afforded by a sealing gasket 41 (Figures 3, 5 and 8). This gasket member is preferably formed from a flexibly resilient material such as rubber or an appropriate rubber substitute and comprises a strip of generally folded cross section and shaped complementary to the fender shield flange 39 which is substantially encased by the sealing gasket strip by engagement of an underlapping leg portion 42 of the strip and an overlapping leg portion 43, the former of which comprises a holding leg and the latter of which comprises a sealing or compression leg which in assembly of the fender shield with the fender is pressed between the fender shield flange 39 and the fender flange 27, 28.

For purpose of positively closing any possible gap that may exist between the fender flange portion 28 and the fender shield flange angular portion 40, the compression leg 43 of the gasket member is provided with a longitudinal resiliently flexible wing flange 44 which normally assumes a position deflected or diverging from the angular portion of the gasket leg 43 at the fender shield flange extremity portion 40. The ring flange is resiliently deflected inwardly by engagement with the fender flange diagonal extremity portion 28, substantially as seen in Figure 8. Another advantage of the flexible wing flange 44 is that since it extends substantially coextensive with the fender flange portion 28, there will be freedom from accumulation of dirt or foreign matter splashed by the adjacent wheel toward the joint between the fender and fender shield flanges and which might interfere with proper replacement of the fender shield when it is removed or might cause corrosion and sticking of the fender shield by lodging between the flanges and remaining for extended periods of nonremoval of the fender shield. Due to the ready flexibility of the wing flange 44 of the gasket, any foreign matter that may lodge between it and the adjacent leg portion of the gasket can readily be cleaned away due to the flexibility of the gasket material and by reason of the wing flange 44 springing away from the adjacent leg portion of the gasket when the fender shield is removed from the fender.

For holding the fender shield 12 up within the wheel access opening 11 and with the fender shield flange 39 internested with the fender flange 27, 28, the fender shield is equipped with hanger-type attachment and latching mechanism generally identified by the numeral 45. As principal components the latching mechanism comprises a vertically shiftable latch member 47, an operating handle 48 and a supporting member or strut 49 (Figures 2 and 3).

The latching member 47 comprises a pair of divergent arms 50 preferably extending diagonally upwardly and toward opposite ends of the fender shield from a common center portion defined by respective downward parallel juncture leg extensions 51 on the arms. Each of the arms 50 has an upwardly extending end portion 52 which terminates in an out-turned downwardly opening hook 53 (Figures 3 and 8). Each of the upward arm extensions 52 is reciprocably guided slidably by a bracket 54 comprising a plate secured as by means of welds 55 to the underside of the fender shield flange 39 and projecting inwardly beyond the inner edge of the fender shield flange to provide a bracket portion clear of the flange and formed with a guide slot 57 within which the respective arm portion 52 is received and slidably vertically guided. By having the slot 57 opening through the edge of the respective bracket plate 54 and toward the adjacent end of the fender shield, assembly of the arm portions 52 therewith is facilitated but at the same time the respective upward arm portions 52 are held in appropriate spaced relation as desired.

The upward arm portions 52 are of adequate length so that when the latching member 47 is moved upwardly relative to the fender shield 12 in a plane substantially parallel to the fender shield panel, the respective hook portions 53 will substantially clear the fender shield flange 39, substantially as indicated in the dash outline position of Figures 2 and 8. This permits the fender shield to be either placed into assembly with the fender or removed from such assembly. In the assembled condition of the fender and fender shield, the latch member 47 is drawn downwardly until the terminal of the latch hooks 53 engage the upper faces of the fender flange portion 28 and draw the fender shield flange 39 clampingly against the underside of the fender flange 27, 28, there being also a generally outward component of force thus exerted against the fender shield flange 39 by downward camming of the clamping hook termini on the surface of the fender flange 28 tending to draw the clamping hooks outwardly to force the upwardly angled fender shield flange portion 40 outwardly toward the fender flange portion 28, as well as drawing the horizontal portion of the fender shield flange 39 toward the fender flange portion 27 and placing the sealing gasket 41 under compressive force by the clamping action between the fender and fender shield flanges. Thus, the fender shield is hangingly supported by and clamped in position by the latch member 47 which acts primarily at the top of the fender shield, while the attachment bracket assemblies 13 retain the lower portion of the fender shield against lateral displacement from the fender.

In an efficient practical construction, the latch member 47 may be made from an appropriate gauge heavy wire stock bent to proper shape. When thus made, the parallel downwardly extending juncture portions 51 of the latch member are preferably disposed in juxtaposition in a plane normal to the plane of the fender shield. At their lower ends the juncture portions 51 are joined integrally in one piece by a preferably loop portion 58 conveniently providing an eye (Figures 2 and 5) into which an actuating arm 59 adjacent to one end of the handle member 48 is adapted to extend operatively.

The handle member 48 is mounted upon the strut member 49 in such a manner that manipulation of the handle will effect vertical reciprocal movement of the latch member 47 relative to the fender shield. To this end, the strut member 49 is preferably formed from suitable sheet metal and is elongated vertically to extend between the base flange 17 of the fender shield and the upper flange 39 thereof. At its lower end, the strut member is formed with a foot flange 60 which is secured on top of the base flange of the fender shield by means such as rivets 61. At its upper end the strut member is formed with a head flange 62 which is secured by welds 63 to the underside of the fender shield upper flange 39. At its sides the strut member is formed with longitudinal reinforcing flanges 64.

At an appropriate area upon the foot flange 60, the body of the strut member 49 is formed with an inwardly projecting flat embossment 65 affording a bearing surface offset from the general plane of the body of the strut member against which an intermediate journal portion 67 of the handle member 48 is bearingly retained through the medium of pivot pin or bearing member 68 (Figures 2 and 6) which may conveniently be rivet headed at its opposite ends and extending through an aperture 69 in the embossment 65, with a washer 70 interposed between the journal portion 67 and the adjacent rivet head. The handle member 48 is preferably formed from suitable heavy gauge wire stock of substantial inherent resiliency and which is formed to provide the journal portion 67 as an intermediate eye loop from one side of which projects the latch actuating arm 59 while the remaining and longer portion of the handle member extends in generally the opposite direction from the journal eye loop. The location of the pivot for the handle 48 is such that when the handle is swung down to the dash outline position shown in Figure 2, the latch member 47 is moved upwardly relative to the fender shield 12 or will permit the fender shield to drop down relative thereto into the dash outline position of the fender shield, as seen in Figure 2. When the handle member 48 is swung upwardly to the full line position shown in Figure 2, the fender shield and the latch member 47 are moved relatively in opposite directions to assume the relative full line positions thereof shown in Figure 2.

To provide for adequate relative movement of the actuating arm 59 of the handle through the eye loop 58 of the latch member, there is, of course, adequate clearance afforded within the eye loop as seen in Figures 5 and 6, and in addition the arm is formed angularly with an extremity portion 71 extending angularly downwardly at the side of the eye loop 58 opposite from the handle pivot in the latching condition of the latch member 47 and arranged to extend substantially horizontally in the open or nonlatching condition of the latch member. The length of the arm 59 intermediate the handle pivot and the angular extremity portion 71 is such that adequate range of reciprocal movement of the latch member 47 is afforded to permit good clearance spacing in the open or nonlatching condition for the latch hooks 53 above the fender shield flange and so that the fender shield may hang down through the medium of the hooks 53 from the fender flange 27 with the trunnion extremity portions 20 at the ends of the fender shield clear of the lower ends of the retaining brackets 15. This open condition is maintained by engagement of the angular extremity portion 71 of the handle arm and the eye 51 of the latch member, a stop lug or flange 72 on the strut 49 being disposed to be engaged by the arm 59 in the limit of unlatching movement thereof. By preference the lug 72 is struck out integrally from the strut member 49 and projects inwardly therefrom into the path of the arm 59 in the fully open or unlatching limit thereof. This prevents escape of the arm extremity 71 from the latch eye 58.

At its free end portion, the handle 48 is formed with a downwardly and inwardly curving hand hold portion 73 (Figures 2, 3 and 7) at the extremity of which is formed a generally downwardly projecting interlock loop 74 which is adapted to engage interlockingly within the channel provided by the fender shield lower flanges 17 and 18. The angularity of the main body of the handle 48 and the latch actuating arm 59 of the handle are such that when the latch hooks 53 have made full latching and clamping engagement with the fender flange and the fender shield flange is fully clamped against the fender flange, the handle portion 73 can be stressed up to dispose the interlocked loop portion 74 up and over the flange 17 of the fender shield into the interlocking retaining engagement, such latched condition being retained under the resilient stress of the handle member. For releasing the latch, the handle member is engaged through the medium of the finger hole loop 73, and is stressed upwardly and inwardly substantially as indicated in Figure 3 to clear the fender shield flange 18, whereupon the handle can be swung down clear of the fender shield flange into the unlatching position.

For guiding the lower juncture portions 51 of the latch member 50 in a vertical path, a vertical guide groove 75 is provided in the face of the lower portion of the strut 49 and opening inwardly for free slidable reception of the outer protrusion of the eye loop 58, as best seen in Figures 2 and 5. This assures that in the vertical reciprocations of the latch member 47, the leg portions 50 thereof will move equally and without canting.

In mounting the fender shield the latch member 47 is moved to the unlatched position thereof relative to the fender shield, and the fender shield may then be lifted up into position inside of the fender until the latch hooks 53 engage over the fender flange 27, 28, or more particularly the inner flange portion 28. The fender shield will then hang in position to be moved into final assembly. Thereupon the handle member 48 is swung upwardly, thus drawing the fender shield upwardly into the assembled condition thereof within the wheel opening 11 until the fender shield flange 39 with the gasket member 41 is brought into full assembly with the fender flange. In this action the trunnion portions 20 at the ends of the fender shield engage within the retaining slots 33 of the bracket members 15 to retain the lower portion of the fender shield against lateral displacement. Finally, the handle 48 is sprung into the interlocked relationship of the interlocked terminal loops 74 thereof with the fender flanges 17 and 18.

For releasing and removing the fender shield 12, the reverse action is effected, namely, the handle 48 is released from the interlocked condition thereof and is swung down, whereupon the weight of the fender shield causes it to drop down while the hook portions 53 maintain a hooked relationship upon the fender flange to suspend the fender shield therefrom. When the fender shield has dropped down so that the terminal trunnion portions 20 are below the ends of the inner legs 38 of the brackets 15, the fender shield can be swung inwardly and then lifted up slightly to release the hooks 53 from the fender flange whereupon the fender shield can be lifted down and away from the fender.

If preferred, the fender shield may be mounted by lifting the same into the fender and while tilted inwardly moving the fender shield generally upwardly until the trunnion portions 20 are received within the slots 33 of the brackets 15. The fender shield is then rocked in a direction normal to the plane of the fender outwardly into final assembly with the fender and the latch mechanism 45 operated to latch the fender shield in place. Similarly, when the fender shield is to be removed it may be held up manually within the wheel access opening 11, the latch mechanism 45 released to move the hooks 53 above the fender flange 28 and the fender shield then swung inwardly rockably about the general axis afforded by the trunnion portions 20 until the latch hooks 53 are clear of the fender flange portion 28, and the fender shield then dropped down and clear of the brackets 15 to be removed from within the fender.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a fender and fender shield assembly, the fender having a wheel access opening and the fender shield being adapted to close said opening, the fender having a bracket at each end of the wheel access opening with a downwardly opening slot therein, each end of the fender shield having a trunnion member projecting endwise therefrom and engaged within the slot of the respective fender bracket, the fender having an inwardly extending upper marginal flange, and latching means on the fender shield releasably engaging said flange to suspend the fender shield in assembled relationship in closing relation to the wheel access opening and with the trunnion members retained within said bracket slots to hold the lower portion of the fender shield against lateral displacement relative to the fender.

2. In combination in a fender and fender shield assembly, the fender having a wheel access opening defined by an inturned marginal flange, the fender shield having an inturned marginal flange internestingly interengageable with the fender flange by upward movement of the fender shield into closing relation within the wheel access opening, respective downwardly opening slotted bracket members at the ends of the wheel access opening on the fender and elongated members on and projecting beyond the ends of the fender shield interengageable with the slotted bracket members as an incident to said upward movement of the fender shield for retaining the lower portion of the fender shield against lateral displacement relative to the fender, and latching mechanism carried by the fender shield and engaging upon the fender to secure the upper portion of the fender shield against displacement relative to the fender and also to hold the fender shield in vertical position within the wheel access opening.

3. In combination in a fender and fender shield assembly, the fender having a wheel access opening and the fender shield being adapted to close the opening, the fender shield being insertible in said opening by upward movement thereof generally in the plane of the fender shield and fender, a trunnion bracket carried by one lower end portion of the fender shield and having a trunnion extremity extending beyond said one end of the fender shield to lie behind the fender, the fender having a bracket including a downwardly opening slot within which said trunnion extremity is received as an incident to upward movement of the fender shield, and means for securing the fender shield against dropping out of the assembled relation to the fender.

4. In a fender shield construction, a fender shield panel having a lower inwardly extending flange, and a trunnion member formed from bar stock including a flattened base portion secured to said flange and a trunnion extremity extending endwise beyond the end of the fender shield, said trunnion extremity being connected to the base portion by an angular offsetting portion extending upwardly and inwardly from said base portion.

5. In a retaining assembly for retaining the lower portion of a fender shield in assembly with a fender, a bracket adapted to be secured to the fender and having a downwardly opening slot at the lower edge thereof, and a trunnion member adapted to be secured to the lower end portion of the fender shield and having a trunnion extremity portion engageable within said slot by upward movement of the trunnion member with the associated fender shield and with the axis of the trunnion member extending within said slot angularly through the edge portion of the fender bracket.

6. In combination in a fender and fender shield assembly, the fender having a wheel access opening defined by an inturned flange, the fender shield having an inturned flange engageable within the inturned flange defining the wheel access opening of the fender, a bracket secured to one lower end portion of the fender flange and having a portion projecting beyond said flange and including a downwardly opening slot therein, a bracket member secured to the corresponding lower end portion of the fender shield and having a portion thereof projecting beyond the fender shield and received within said slot by upward movement of the fender shield with the trunnion member, and means connecting the fender shield in supported relation to the fender.

7. In a latching mechanism for securing a fender shield to a fender, a latching member comprising a wire body having divergent arms with upwardly extending hook portions and downwardly extending juncture portions angular to said arms and joined together in an eye loop adapted to receive an actuating member therein, said juncture portions affording a substantial vertical spacing between the divergent arms and said eye loop.

8. In a latching mechanism for use with a fender shield, a handle member formed from heavy wire stock and including an elongated portion having manual engageable means at one end and a return bent portion adjacent the opposite end, said return bent portion being reversely bent generally upon itself to provide a journal loop and having extending angularly therefrom an arm adapted to engage a latching member for actuating the latching member as an incident to swinging of the lever about a pivot provided by said journal loop.

9. In combination in a latching mechanism for use with a fender shield, a latching member, a support member, and a handle member, the latching member being reciprocably movable relative to the support member, an elongated guideway groove on said support member, means on said latching member slidably movable in said guideway groove, the handle member being pivotally secured to said support member and having a portion thereof in actuating engagement with said latch member.

10. In combination in a fender shield assembly of the character described, a fender shield panel, a vertical strut supported at the back of said panel, a vertically movable latching member guided by said strut, a handle member comprising a torsion rod having an intermediate journal loop thereon pivotally attached to said strut and having an arm in operative engagement with said latching member, said handle having an elongated portion projecting from said journal portion and adapted to swing below the lower edge of the fender shield, the fender shield having an angular generally channel-shaped flange along its lower edge, said flange including an upwardly extending portion on its inner margin, and the handle having an interlock portion thereon engageable within said channel-shaped flange on the outer side of said upwardly extending portion for holding the latching member in the latching condition thereof.

11. In a fender shield, a fender shield panel, a reciprocable latching member on the inner side of the panel having a portion formed with an eye the axis of which is generally parallel to the panel, means for guiding the member for movement in a substantially straight path of reciprocation, and an actuating lever mounted on the inner side of the panel and intermediately pivoted on an axis normal to the panel and having an arm extending on an axis generally parallel to the panel and generally reciprocably slidably through said eye, said arm being of angular shape to move freely and without binding through the eye during actuation of the latching member in which swinging of the arm and generally reciprocable movement thereof in said eye are translated into longitudinal movement of the latching member.

12. In combination in fender shield latching mechanism, an elongated strut member, a latching member movable longitudinally with respect to the strut member, means on said strut member defining an elongated longitudinally extending guide channel, and means on the latching member providing a shoulder in said channel for guiding the latching member in its longitudinal movement.

13. In combination in a fender shield assembly, a fender shield panel, a vertical strut supported at the back of said panel, a vertically movable latching member comprising a pair of divergent arm portions having latching heads adjacent the upper edge of said panel, means on the upper margin of the panel in guiding association with said latch head portions, the lower end portion of the latching member comprising a journal loop disposed in a plane normal to the rear face plane of the strut, the strut having a vertical channel opening rearwardly and with the adjacent side of said journal loop slidably guided therein for vertical guiding of the lower portion of the latch member, and a latch operating member mounted at the back of the panel and having an actuating arm operably disposed in said loop.

14. In combination in a fender shield assembly, a fender shield panel, a vertical strut supported at the back of said panel, a vertically movable latching member comprising a pair of divergent arm portions having latching heads adjacent the upper edge of said panel, means on the upper margin of the panel in guiding association with said latch head portions, the lower end portion of the latching member comprising a journal loop disposed in a plane normal to the rear face plane of the strut, the strut having a vertical channel opening rearwardly and with the adjacent side of said journal loop slidably guided therein for vertical guiding of the lower portion of the latch member, and a latch operating member mounted at the back of the panel and having an actuating arm operably disposed in said loop, said strut member having a stop projection extending generally inwardly and located adjacent to said guide channel for limiting the movement of said actuating arm in the upward movement of the latching member.

15. In combination in a fender shield assembly, a fender shield panel, a vertical strut supported at the back of said panel, a vertically movable latching member comprising a pair of divergent arm portions having latching heads adjacent the upper edge of said panel, means on the upper margin of the panel in guiding association with said latch head portions, the lower end portion of the latching member comprising a journal loop disposed in a plane normal to the rear face plane of the strut, the strut having a vertical channel opening rearwardly and with the adjacent side of said journal loop slidably guided therein for vertical guiding of the lower portion of the latch member, a latch actuating member mounted at the back of the panel and having an actuating arm operably disposed in said loop, and a pivotal connection for said actuating member on said strut and with the actuating member disposed at the inner side of the strut on a pivotal axis at one side of said channel.

16. In combination in a fender shield latching mechanism, a sheet metal strut member having a longitudinal groove therein, a longitudinally movable latching member having a loop eye with a portion of the loop guidingly slidable in said groove, the axis of the eye being in spaced relation to the adjacent face of the strut, and an actuating member pivotally mounted on said face of the bracket member and having an actuating arm extending operably through said eye for slidably moving said loop in said groove and thereby longitudinally moving the latching member and having a manipulating portion extending generally oppositely to said arm.

17. In a fender and fender shield assembly, the fender having a wheel access opening closed by the fender shield, the fender and fender shield having cooperating end portions at one end of the wheel access opening, one of said end portions having a bracket thereon having a notch therein opening from the bracket, the other of said end portions having a bar bracket thereon engaged sidewise of the bar within said notch and cooperating with the notched bracket to retain said end portions in predetermined assembled relationship, and additional means cooperative with said brackets to retain the fender shield in fully assembled relation to the fender.

18. In combination in a fender and fender shield assembly, a fender having a wheel access opening defined by an inwardly extending marginal reinforcing flange including a horizontal portion and an inwardly and upwardly slanting inner marginal flange portion, a fender shield panel having a marginal reinforcing flange generally complementary to said fender flange and including a generally horizontal inwardly extending portion and a generally inwardly and upwardly extending inner marginal portion, and a resilient gasket carried by the fender shield flange and including a portion interposed between the horizontal portions of the fender and fender shield flanges and two portions carried to lie between the slanting portions of the flanges, one of said two portions of the gasket being assembled substantially fixedly with the inner marginal portion of the fender shield flange and the other of said two portions being integrally joined to the remainder of the gasket along a line rearwardly of the juncture of the portions of the fender flange so as to lie against the inner marginal portion of the fender flange in the assembly and being of tapered cross section to a relatively thin upper edge and so disposed with relation to the remainder of the gasket as normally to tend to flex outwardly so as to take up slack between the inner marginal portions of the flanges and the adjacent companion portion of the gasket and also to break away from or permit breaking away from matter that may be splashed thereon in service.

19. In a fender shield assembly, a fender shield panel adapted for closing a wheel access opening in a fender, said panel having a marginal reinforcing flange including a generally horizontally inwardly extending portion and a generally inwardly and upwardly extending inner marginal portion at a slanting angle to said horizontally extending portion, and a resilient gasket carried by the fender shield flange and including a portion complementary to and arranged to lie upon the upper side of said horizontal portion of the fender shield flange and a second slantingly related gasket portion to lie upon the upper surface of the slantingly extending fender flange portion and complementary thereto, said gasket having a wing flange integral with said horizontally extending portion of the gasket substantially at juncture with the slanting portion of the gasket and normally extending at a slanting angle to said horizontal portion of the fender shield flange and convergent to but in spaced relation to said slanting portion of the gasket, said wing flange tapering from juncture with the gasket to its distal edge and being resiliently flexible toward and away from said slanting portion of the gasket.

20. In combination in a latching mechanism of the character described for use with a fender shield, a latch member formed from heavy wire-like stock and including a pair of divergent arms having upwardly extending hook portions, guiding means adapted to be mounted on a fender shield for vertically guiding said upwardly extending hook portions, the latch member having a portion thereof intermediate said arms formed into a loop extending generally up and down, a handle having a portion engaging in said loop and arranged to be actuated for reciprocably moving the latch member, and means adapted to be mounted on the fender shield providing a guideway in which one side of said loop clear of said handle portion is reciprocably movably guided.

GEORGE W. SCHATZMAN.

REFERENCES CITED

The following references are of record in the file of this patent:

UNITED STATES PATENTS

| Number | Name | Date |
| --- | --- | --- |
| 1,931,850 | Moore | Oct. 24, 1933 |
| 2,070,230 | Harroun | Feb. 9, 1937 |
| 2,115,768 | Haltenberger | May 3, 1938 |
| 2,215,619 | Patrick et al. | Sept. 24, 1940 |
| 2,267,433 | Tea | Dec. 23, 1941 |
| 2,336,545 | Jandus | Dec. 14, 1943 |

FOREIGN PATENTS

| Number | Country | Date |
| --- | --- | --- |
| 327,903 | Great Britain | Apr. 17, 1930 |